(12) United States Patent
Yamaguchi et al.

(10) Patent No.: US 7,995,189 B2
(45) Date of Patent: Aug. 9, 2011

(54) OPTICAL DISTANCE MEASURING SENSOR AND ELECTRONIC DEVICE

(75) Inventors: Akifumi Yamaguchi, Osaka (JP); Masaru Kubo, Osaka (JP); Toshihiko Fukushima, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 23 days.

(21) Appl. No.: 12/542,115

(22) Filed: Aug. 17, 2009

(65) Prior Publication Data

US 2010/0045963 A1    Feb. 25, 2010

(30) Foreign Application Priority Data

Aug. 20, 2008    (JP) .................................. 2008-211796

(51) Int. Cl.
*G01C 3/08*    (2006.01)
(52) U.S. Cl. ...................................... 356/3.01; 356/4.01
(58) Field of Classification Search ............ 356/3.01, 356/4.01, 5.01; 250/201.6
See application file for complete search history.

(56) References Cited

U.S. PATENT DOCUMENTS

| | | | |
|---|---|---|---|
| 4,983,033 A * | 1/1991 | Suzuki | 356/3.01 |
| 6,844,562 B2 | 1/2005 | Takaoka et al. | |
| 7,505,121 B2 | 3/2009 | Yamaguchi | |
| 7,760,332 B2 * | 7/2010 | Yamaguchi | 356/3.06 |
| 2006/0244945 A1 | 11/2006 | Yamaguchi | |
| 2007/0210267 A1 | 9/2007 | Ishii et al. | |

FOREIGN PATENT DOCUMENTS

| | | |
|---|---|---|
| CN | 1854682 A | 11/2006 |
| JP | 9-318315 | 12/1997 |
| JP | 2000-65532 A | 3/2000 |
| JP | 2002-195807 | 7/2002 |
| JP | 2003-287420 | 10/2003 |
| JP | 2005-241621 A | 9/2005 |
| JP | 2006-308416 A | 11/2006 |
| JP | 2008-096450 A | 4/2008 |
| JP | 2008-151702 A | 7/2008 |
| JP | 2008-157718 A | 7/2008 |

\* cited by examiner

*Primary Examiner* — Isam Alsomiri
(74) *Attorney, Agent, or Firm* — Nixon & Vanderhye P.C.

(57) ABSTRACT

An optical distance measuring sensor includes a light receiving element arranged on the same plane as a light emitting element. The light receiving element includes a light receiving unit having a plurality of cells and collecting the light emitted from the light emitting element and reflected by a target object, a flash memory unit storing a predetermined position on the light receiving unit, and a signal processing circuit unit sensing the collection position of the light on the light receiving unit, and measuring the distance to the target object based on a relative positional relationship between the predetermined position stored in the flash memory unit and the collection position of the light on light receiving unit.

20 Claims, 11 Drawing Sheets

OPTICAL DISTANCE MEASURING SENSOR AND ELECTRONIC DEVICE

This nonprovisional application is based on Japanese Patent Application No. 2008-211796 filed on Aug. 20, 2008 with the Japan Patent Office, the entire contents of which are hereby incorporated by reference.

BACKGROUND

1. Field of the Technology

The present technology relates to an optical distance measuring sensor and an electronic device, and particularly to an optical distance measuring sensor for measuring a distance to a target object located within a predetermined range as well as an electronic device including the sensor.

2. Description of the Background Art

Figure 13:
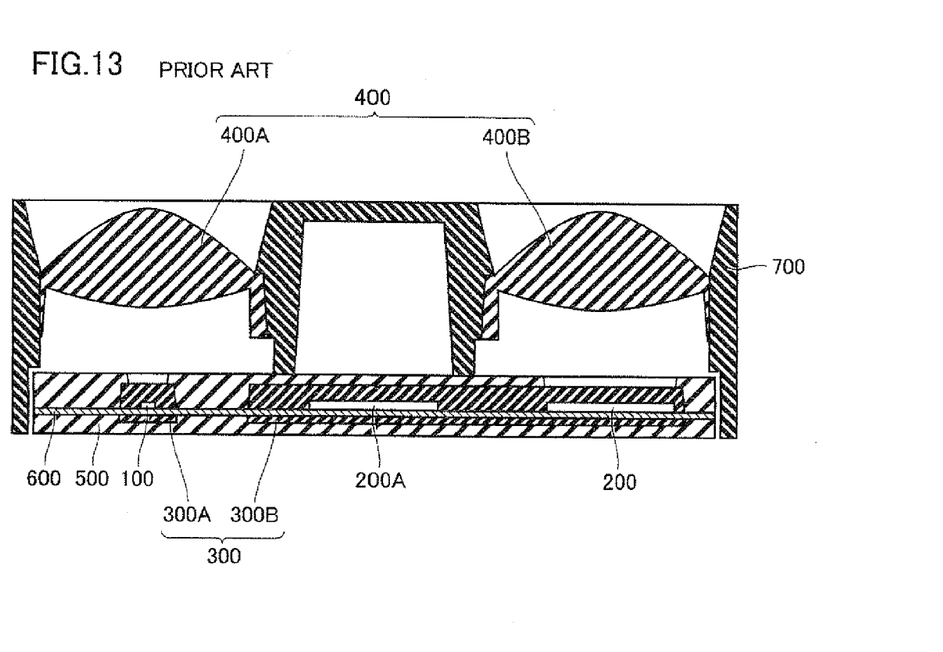
FIG. 13 is a cross section of a conventional optical distance measuring sensor.

There have been known optical distance measuring sensors for measuring a distance to a target object located within in a predetermined range by a triangulation method. FIG. 13 is a cross section showing a conventional optical distance measuring sensor.

Referring to FIG. 13, the conventional optical distance measuring sensor includes a light emitting element 100, a light receiving element 200, an integrated circuit unit 200A that drives light emitting element 100 and processes signals provided from light receiving element 200, transparent resin units 300 (300A and 300B) sealing light emitting element 100 and light receiving element 200, respectively, lenses 400 (400A and 400B) on a light emitting side and a light receiving side, a light-blocking resin unit 500 holding light emitting element 100, light receiving element 200 and transparent resin unit 300, a lead frame 600 and a lens casing 700.

In the distance measuring sensor shown in FIG. 13, light receiving element 200 is provided with only one PSD (Position Sensitive Detector). The PSD has a resistance value that is uniform and constant throughout the PSD. Assuming that $I_1$ and $I_2$ indicate signals (current values) obtained from two terminals of light receiving element 200, respectively, distance measurement is performed by obtaining an output value corresponding to a distance from $(I_1/(I_1+I_2))$.

The optical distance measuring sensor described above has been disclosed, e.g., in Japanese Patent Laying-Open Nos. 09-318315 and 2003-287420.

Japanese Patent Laying-Open No. 2002-195807 has disclosed a structure that uses a CMOS image sensor as a position sensing element.

In the optical distance measuring sensor shown in FIG. 13, the PSD (Position Sensitive Detector) used as the element on the light receiving side includes only one light receiving unit, and the resistance value of the light receiving unit is uniform and constant throughout the light receiving unit. Therefore, an accuracy of distance measurement is high when a distance to the object is short, but the accuracy of distance measurement is low when the distance to the object is long. The cause of this problem will be described below with reference to FIGS. 14 and 15.

Figure 14:
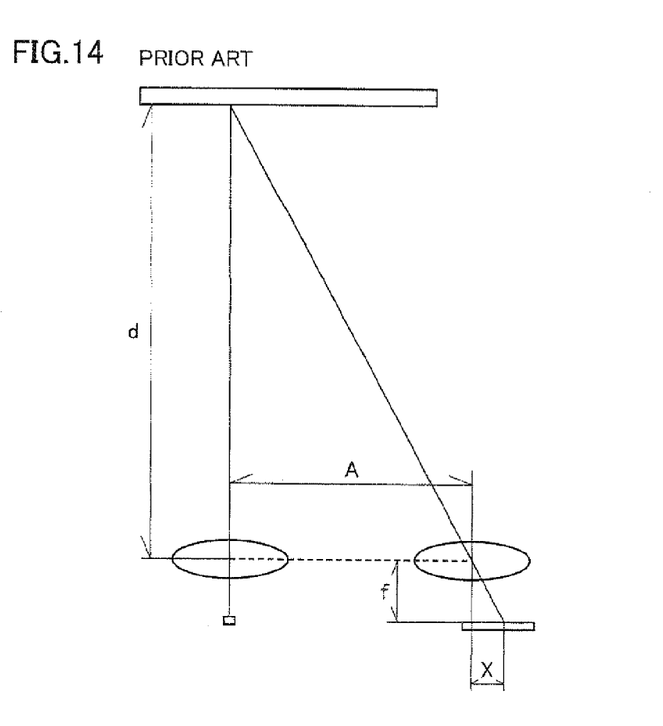
FIGS. 14 and 15 illustrate a principle of a triangulation method.
Figure 15:
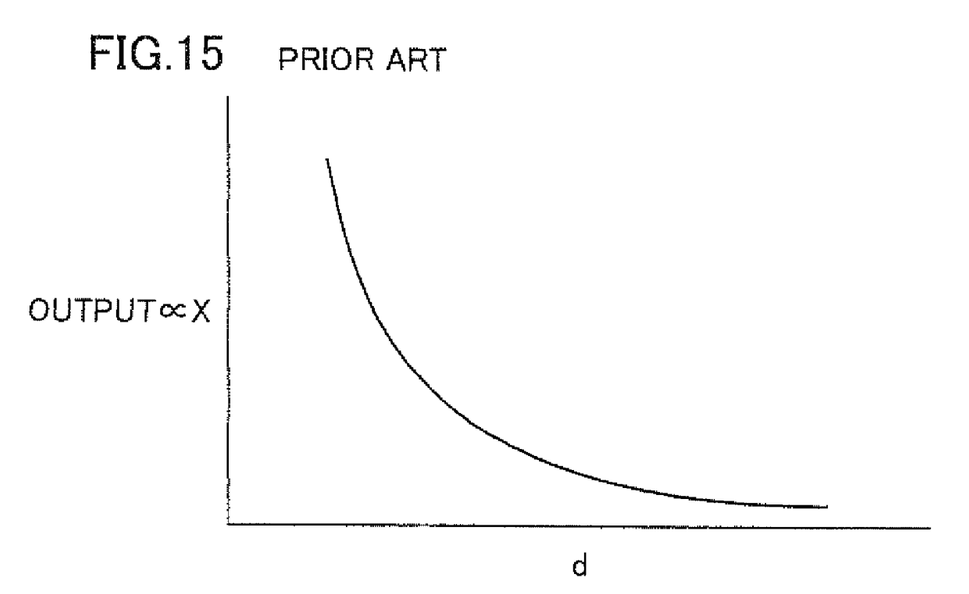

Referring to FIG. 14, in an optical distance measuring sensor that senses a distance (d) to an object by the triangulation method, the distance (d) to the object is inversely proportional to an output (X) of a light receiving unit as shown in FIG. 15, and the changes in output caused by variations in distance are large when the distance to the object is short, and are small when the distance to the object is long. Therefore, in a range where the distance (d) to the object is long, large variations do not occur in output (X) of the light receiving unit even when a predetermined amount of variations occur in distance (d).

Conversely, the accuracy can be increased by increasing a center distance (A) between centers of lenses on the light emitting side and the light receiving side, or a distance between the lens on the light receiving side and the light receiving element, i.e., a focal distance (f) of the lens on the light receiving side. However, the increase in such distances (A) and (f) results in increase in size of the optical distance measuring sensor.

In the conventional distance measuring sensor, the accuracy of the distance measurement is low when the distance (d) to the object is long. Therefore, only a practical measurable distance range in which a ratio between the maximum and minimum measurable distances is substantially eight or less has been available.

Japanese Patent Laying-Open No. 2002-195807 has disclosed the structure that employs the CMOS image sensor as the position sensing element. In this document, however, a light emitting element and a light receiving element are not located on the same plane, and each element employs an independent package. Further, a unit of processing a signal provided from the CMOS image sensor as well as a drive circuit unit of the light emitting element are arranged outside a CMOS image sensor chip. Consequently, the structure in Japanese Patent Laying-Open No. 2002-195807 suffers from a problem that the distance measuring sensor has large sizes as well as problems that production steps are large in number, operations in various steps are complicated when high accuracies are required, and a production cost is high.

SUMMARY

A feature of an example embodiment presented herein is to provide inexpensively an optical distance measuring sensor having reduced sizes and a high accuracy of measurement as well as an electronic device including the sensor.

An optical distance measuring sensor according to the example embodiment is a sensor for sensing a distance to a target object by a triangulation method. The optical distance measuring sensor includes a light emitting element; a light receiving element arranged on the same plane as the light emitting element; first and second transparent resin units sealing the light emitting element and the light receiving element, respectively; first and second lenses arranged forward of the light emitting element and the light receiving element, respectively; and a light-blocking resin unit holding the light emitting element and the light receiving element to form a predetermined distance between the light emitting element and the light receiving element. The light receiving element includes a light receiving unit having a plurality of cells and collecting light emitted from the light emitting element and reflected by the target object, a memory unit storing a predetermined position on the light receiving unit, and an arithmetic operation unit sensing a collection position of the light on the light receiving unit based on a result of the sensing of said light by the plurality of cells, and measuring a distance to the target object based on a relative positional relationship between the predetermined position stored in the memory unit and the collection position of the light on light receiving unit.

According to the above structure, since the light receiving unit that collects the light reflected by the target object has the plurality of cells, the accurate measurement can be performed without excessively increasing the distance (A) between the lenses as well as the focal distance (f) between the light receiving unit and the lens on the light receiving side. Therefore, the optical distance measuring sensor having reduced sizes and a high measurement accuracy can be obtained inexpensively.

In an embodiment of the above optical distance measuring sensor, the plurality of cells are arranged in one row in a direction of alignment of the light emitting element and the light receiving element.

In an embodiment of the above optical distance measuring sensor, a width of each of the plurality of cells in a direction of alignment of the light emitting element and the light receiving element is 5 µm or less.

In an embodiment of the above optical distance measuring sensor, a distance between centers of the first and second lenses is 10 mm or less, and a width of the light receiving unit in a direction of alignment of the light emitting element and the light receiving element is 5 mm or less.

In an embodiment of the above optical distance measuring sensor, a distance between centers of the first and second lenses is 2 mm or less, and a width of the light receiving unit in a direction of alignment of the light emitting element and the light receiving element is 1.5 mm or less.

In an embodiment of the above optical distance measuring sensor, the arithmetic operation unit senses a position corresponding to a peak value of a light quantity as the collection position of the light on the light receiving unit based on a light quantity distribution on the light receiving unit.

In an embodiment of the above optical distance measuring sensor, the arithmetic operation unit senses a position corresponding to a centroid of a light quantity as the collection position of the light on the light receiving unit based on a light quantity distribution on the light receiving unit.

In an embodiment of the above optical distance measuring sensor, the arithmetic operation unit senses, based on a distribution of light quantity on the light receiving unit, a position corresponding to a geometrical centroid of a region of the distribution as the collection position of the light on the light receiving unit.

In an embodiment of the above optical distance measuring sensor, the arithmetic operation unit senses, based on a distribution of light quantity on the light receiving unit, at least two positions selected from among a position corresponding to a peak value of a light quantity, a position corresponding to a centroid of a light quantity and a position corresponding to a geometrical centroid of a region of the distribution, and calculates the collection position of the light on the light receiving unit based on a combination of results of the sensing.

In an embodiment of the above optical distance measuring sensor, the predetermined position on the light receiving unit stored in the memory unit is calculated based on the positions corresponding to the peak value of the light quantity, the centroid of the light quantity and the geometrical centroid of the distribution region, respectively, each obtained based on the light quantity distribution of the light emitted by the light emitting element, reflected by an object spaced from the optical distance measuring sensor by a predetermined distance and collected on the light receiving unit, or is calculated based on a combination of these positions.

In the specification, "the light quantity centroid" means a centroid of a light collection region obtained by weighting with the light quantity of the light collected on the light receiving unit.

In the specification, "the geometrical centroid of the distribution region" means a geometrical centroid of a region where the light received by the light receiving unit is distributed.

In an embodiment of the above optical distance measuring sensor, the second lens arranged forward of the light receiving element is a Fresnel lens.

In an embodiment of the above optical distance measuring sensor, the light emitting element is a resonant cavity light-emitting diode.

In an embodiment of the above optical distance measuring sensor, the light emitting element is a vertical cavity surface emitting laser.

In an embodiment, the optical distance measuring sensor further includes a diffraction grating arranged on an optical path extending from the light emitting element to the target object, and splitting the light emitted from the light emitting element in a direction perpendicular to the alignment direction the light emitting element and the light receiving element.

In an embodiment of the above optical distance measuring sensor, the light emitting element and the light receiving element are mounted on a common lead frame.

An electronic device according to the example embodiment includes the optical distance measuring sensor described above. In an embodiment, the electronic device is a personal computer or a mobile phone.

As described above, the example embodiment can inexpensively provide the optical distance measuring sensor having the reduced sizes and the high accuracy of measurement as well as the electronic device including the sensor.

The foregoing and other features, aspects and advantages of the example embodiment will become more apparent from the following detailed description of the present example embodiment when taken in conjunction with the accompanying drawings.

DESCRIPTION OF THE PREFERRED EMBODIMENTS

Embodiments will now be described with reference to the drawings. In the following description, the same or corresponding portions bear the same reference numbers, and description thereof is not repeated.

When the following description of the embodiment(s) refers to numbers of parts, quantities and/or the like, the scope of the invention is not necessarily restricted to such numbers, quantities and/or the like unless otherwise specified. Each of components of the following embodiment(s) is not essential in the invention unless otherwise specified. When a plurality of embodiments are described below, an appropriate combination of the structures of such embodiments can be originally envisaged unless otherwise specified.

Figure 1:
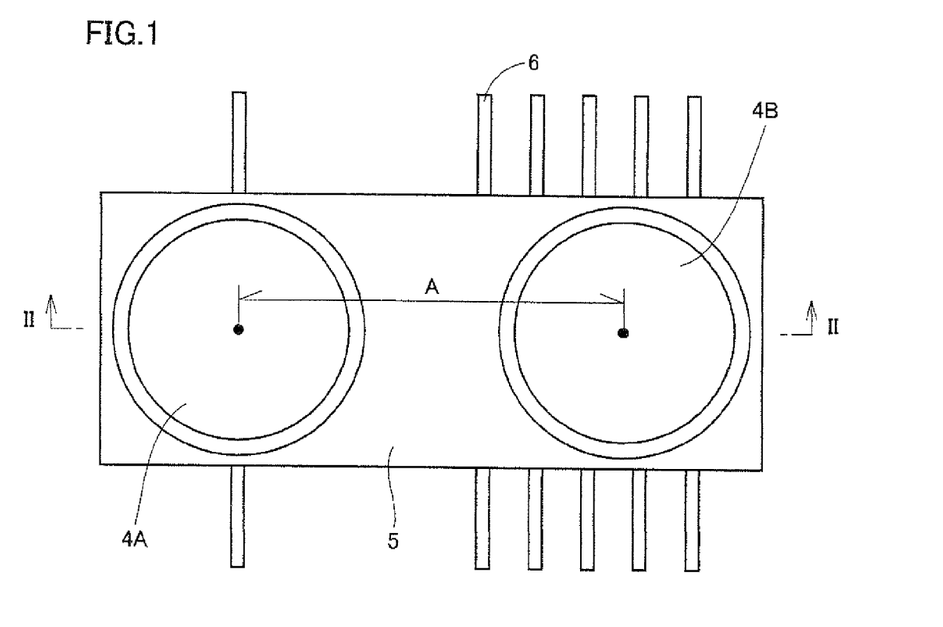
FIG. 1 is a top view of an optical distance measuring sensor according to an embodiment.
Figure 2:
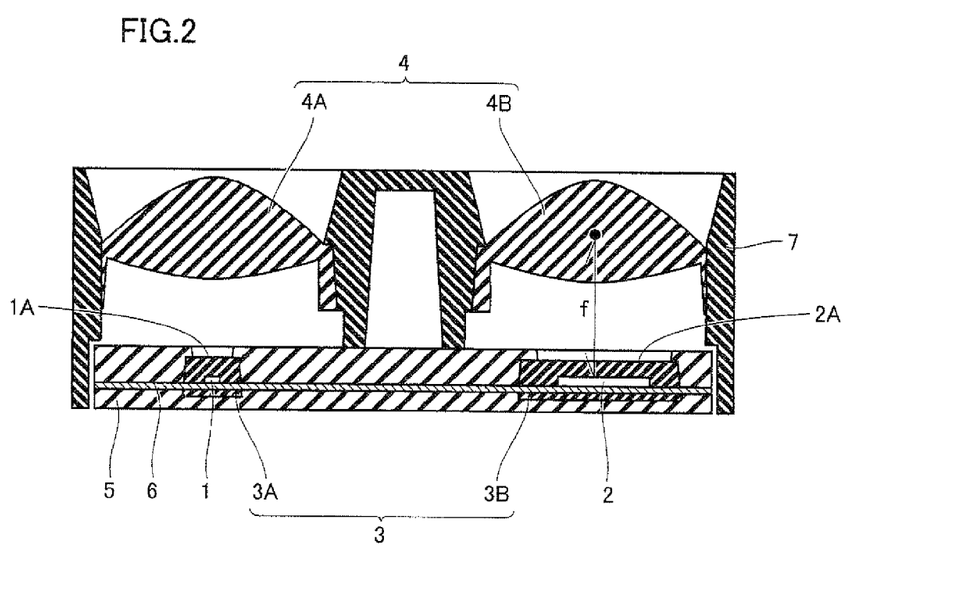
FIG. 2 is a cross section taken along line II-II in FIG. 1.

FIG. 1 is a top view of an optical distance measuring sensor according to an embodiment. FIG. 2 is a cross section taken along line II-II in FIG. 1.

Referring to FIGS. 1 and 2, the optical distance measuring sensor according to the embodiment includes a light emitting element 1, a light receiving element 2, transparent resin units 3 (3A and 3B), lenses 4 (4A and 4B), a light-blocking resin unit 5, a lead frame 6 and a lens casing 7.

Light emitting element 1 is formed of, e.g., one infrared LED or the like. Light emitting element 1 and light receiving element 2 are mounted on lead frame 6. Light emitting element 1 and light receiving element 2 are arranged side by side with a predetermined distance (A) therebetween. Each of light emitting element 1 and light receiving element 2 is sealed by a transparent epoxy resin 3 (3A and 3B) applied by transfer mold. Light emitting element 1 and light receiving element 2 are covered with light-blocking resin unit 5 applied by injection molding except for windows 1A and 2A accepting the light, respectively.

Lens casing 7 holds lens 4A and 4B on the light emitting side and the light receiving side, respectively. Lens 4A and 4B are made of an acryl resin or a polycarbonate resin that is a visible light cutoff material. Lens casing 7 is made of an ABS resin or a polycarbonate resin. Lenses 4 and lens casing 7 are formed integrally with each other by two-color molding.

Figure 3:
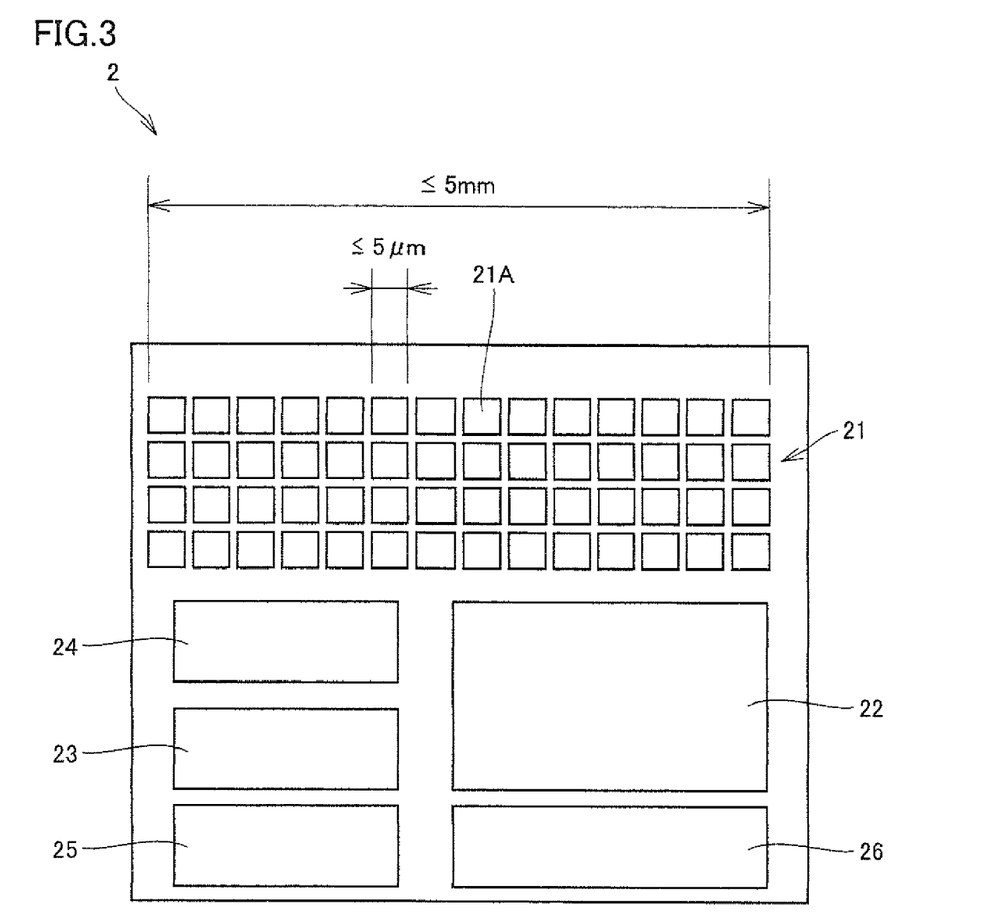
FIG. 3 is a top view of the optical distance measuring sensor and the light receiving element shown in FIGS. 1 and 2.

FIG. 3 is a top view of light receiving element 2. Referring to FIG. 3, light receiving element 2 includes a light receiving unit 21, a signal processing circuit unit 22, a software memory unit 23, a data memory unit 24, a flash memory unit 25 and a drive circuit unit 26.

Light receiving unit 21 is a CMOS area sensor of m rows and n columns. Light receiving unit 21 includes a plurality of light receiving cells 21A. In the example of FIG. 3, m is equal to 14 (rows), and n is equal to 4 (columns). The example of FIG. 3 has 56 light receiving cells 21A in total. In another typical example, n may be equal to 1 (column). In this case, the plurality of light receiving cells 21A are arranged in one column extending in the direction (lateral direction in FIG. 3) in which light emitting element 1 and light receiving element 2 are aligned.

Signal processing circuit unit 22 functions as an "arithmetic unit" that calculates a distance from a target object in a manner to be described later. Software memory unit 23 is employed for storing software that is used for performing arithmetic in signal processing circuit unit 22. Data memory unit 24 is required for temporarily storing data when signal processing circuit unit 22 performs the arithmetic. Flash memory unit 25 has stored a predetermined position in light receiving unit 21. As will be described later, signal processing circuit unit 22 is configured to calculate the distance to the target object based on a relative positional relationship between the "predetermined position" stored in flash memory unit 25 and a light collection position where light receiving unit 21 receives the light.

A width of light receiving cell 21A can be appropriately changed. In a typical example of the embodiment, the width of light receiving cell 21A measured in the direction of alignment of light emitting element 1 and light receiving element 2 (i.e., in the lateral direction of FIG. 3) is substantially equal to 5 μm or less. In the typical example of the embodiment, the distance between centers of lenses 4A and 4B is substantially equal to 10 mm or less, and the width of light receiving unit 21 in the direction of alignment of light emitting element 1 and light receiving element 2 (i.e., in the lateral direction of FIG. 3) is substantially equal to 5 mm or less.

In the typical example of the embodiment, the distance between centers of lenses 4A and 4B is substantially equal to 2 mm or less, and the width of light receiving unit 21 in the direction of alignment of light emitting element 1 and light receiving element 2 (i.e., in the lateral direction of FIG. 3) is substantially equal to 1.5 mm or less.

In the optical distance measuring sensor that senses a distance (d) to the object by the triangulation method, the output thereof is inversely proportional to the distance (d) to the object, and there is such a tendency that the changes caused in output by variations in distance are large when the distance to the object is short, and are small when the distance to the object is long. Therefore, when the distance (d) to the object is long, a light spot moves a small amount or distance on light receiving unit 21 in accordance with changes in distance. This amount of the light spot movement also changes depending on the distance (A) between the centers of lenses 4A and 4B on the light emitting side and the light receiving side as well as the distance between lens 4B on the light receiving side and the light receiving unit, i.e., a focal distance (f) of lens 4B on the light receiving side. Thus, the amount that the light spot moves according to the changes in distance to the target object can be increased by increasing the lens center distance (A) and the focal distance (f) on the light receiving side. However, such increased distances increase the sizes of the optical distance measuring sensor.

For example, when the optical distance measuring sensor is to be used in a personal computer for sensing a human body (i.e., for determining whether a person is present in front of the personal computer or not, and performing control, e.g., to turn off a monitor for energy saving when no person is present), or when it is to be used for automatic focusing of a mobile telephone, it is preferable that the center distance (A) between lenses 4A and 4B on the light emitting side and the light receiving side is substantially equal to 10 mm or less, and lens focal distance (f) is substantially equal to 5 mm or less. In this case, when a measurable distance range is substantially from 1 cm to 200 cm, the light spot on light receiving unit 21 moves an amount of 4.975 mm (=10×5×(1/10−1/2000)). In this embodiment, the width of light receiving unit 21 (i.e., the width of light receiving unit 21 formed of the plurality of light receiving cells 21A) is substantially equal to 5 mm in the direction of straight line extending through the centers of light emitting element 1 and light receiving unit 21. However) when the measurable distance range becomes narrow, the movement amount of the light spot decreases, and therefore can be smaller than 5 mm. For example, when a difference of about 10 cm is to be sensed in a position of about 200 cm on the long distance side (the difference shorter than this is hardly required in practical use), the movement amount of the light spot on light receiving unit 21 is substantially equal to 1.3 μm (=10×5×(1/1900−1/2000)). The CMOS area sensor can sense a range in one cell irradiated with the light with a certain degree of accuracy (about 20%). Thus, it can sense the light spot movement amount of about 1.3 μm when light receiving cell 21A has a width of about 5 μm or less. Therefore, light receiving cell 21A in light receiving unit 21 preferably has the width of about 5 μm or less in the direction of the straight line extending through the centers of light emitting element 1 and light receiving unit 21. This configuration can implement the distance measuring sensor having smaller sizes and higher accuracy than the convention structures while ensuring a wide measurable distance range from 1 to 200 cm ((maximum value)/(minimum value)=200).

In the case where the measurable distance range is substantially equal to a conventional range (e.g., of 10 cm-80 cm and thus (maximum value)/(minimum value) is equal to 8), the center distance (A) between the centers of lenses 4A and 4B on the light emitting side and light receiving side can be significantly reduced to about 5 mm, and the lens focal distance (f) can be significantly reduced to about 2.5 mm, even when the accuracy substantially equal to that of the above example is to be ensured. In this case, the movement amount of the light spot on light receiving unit 21 is equal to 0.11 mm (=5×2.5×(1/100−1/800)), and the width of light receiving unit 21 (i.e.) the width of light receiving unit 21 formed of the plurality of light receiving cells 21A) can be significantly decreased.

In a proximity region of which measurable distance range is substantially from 1 mm to 30 mm, the minimum sizes that allow sensing of a distance variation of about 1 mm on the long distance side of about 30 mm, i.e. the minimum sizes that allow the light spot movement amount of about 1 μm on light receiving unit 21 near the position of 30 mm are such that the center distance (A) between the centers of lenses 4A and 4B on the light emitting side and the light receiving side is substantially 2 mm and the lens focal distance (f) is substantially 0.5 mm. In this case, the light spot movement amount on light receiving unit 21 is equal to 0.97 mm (=2×0.5×(1/1−1/30)), and the width of light receiving unit 21 (i.e., the width of light receiving unit 21 formed of the plurality of light receiving cells 21A) is merely required to be about 1.5 mm in the direction of the straight line extending through the centers of light emitting element 1 and light receiving element 21. Therefore, a proximity sensor of considerably small sizes can be implemented.

As described above, by reducing the width of light receiving unit 21, the size of light receiving element 21 that includes the CMOS image sensor and other circuit units is reduced, and the package sizes can be reduced so that an inexpensive proximity sensor can be implemented. This proximity sensor can be used as a substitution of a mechanical switch, and also can be used for determining whether a cellular phone is being used for conversation or not (i.e., whether the cellular phone is located near an ear or not) so that a monitor can be turned off based on a result of this determination for energy saving and/or another function can be controlled.

In a region of which measurable distance range is substantially from 500 mm-5000 mm, the minimum sizes that allow sensing of the distance variation of about 100 mm in the position of about 5000 mm, i.e., the minimum sizes that allow the light spot movement amount of about 1 μm on light receiving unit 21 near the position of 5000 mm are such that the center distance (A) between the centers of lenses 4A and 4B on the light emitting side and the light receiving side is substantially 25 mm and the lens focal distance (f) is substantially 10 mm. In this case, the light spot movement amount on light receiving unit 21 is equal to 0.45 mm (=25×10×(1/50−1/5000)), and the width of light receiving unit 21 (i.e., the width of light receiving unit 21 formed of the plurality of light receiving cells 21A) is merely required to be about 1 mm in the direction of the straight line extending through the centers of light emitting element 1 and light receiving element 21. Therefore, a long-distance sensor of considerably small sizes can be implemented. Such a long-distance sensor may be used to sense a person on a road, passage, entrance or the like for a security purpose (in which case it is linked with a security camera because the security camera can take a picture of a human body but cannot measure a distance to the human body). Also, the long-distance sensor can be applied to a function of a projector that measures a distance from the projector to a screen for automatic focusing (particularly, this function is effective in a portable projector because a distance from the portable projector to the screen varies every time it is used).

In a method of processing signals provided from light receiving unit 21, a light spot position on light receiving unit 21 corresponds to a predetermined distance stored in flash memory unit 25 in a chip that forms light receiving element 2 for each distance measuring sensor. A target object is placed at a distance to be measured. Light emitted from the light emission side is reflected by the object and is collected on light receiving unit 21 through lens 4B on the light receiving side, and a light quantity distribution of each light receiving cell 21A is obtained as a result of the above collection of the light. A relative positional relationship is obtained between the above light spot position corresponding to the predetermined distance and a light spot position that is obtained based on the light quantity distribution thus obtained. The method provides the output according to this relative positional relationship. As described above, calibration is performed using the light spot position on light receiving unit 21 corresponding to the predetermined distance stored in flash memory unit 25. Thereby, the accurate distance measurement can be performed.

Figure 4:
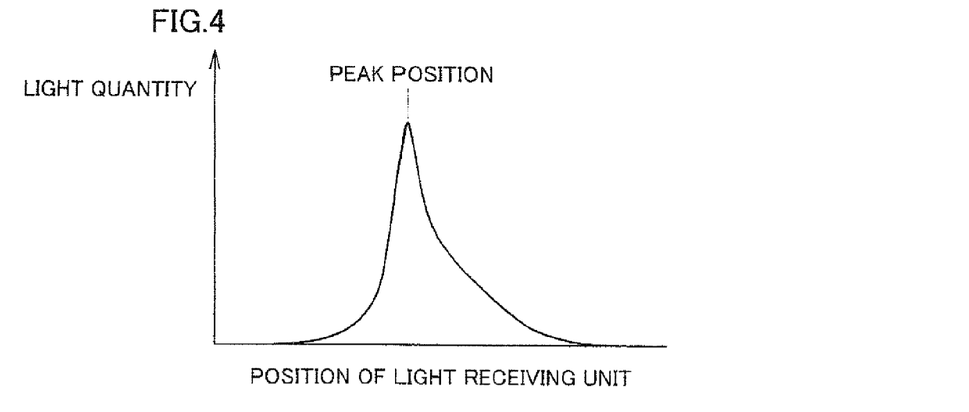
FIGS. 4 to 6 illustrate states of light collection on a light receiving unit.
Figure 5:
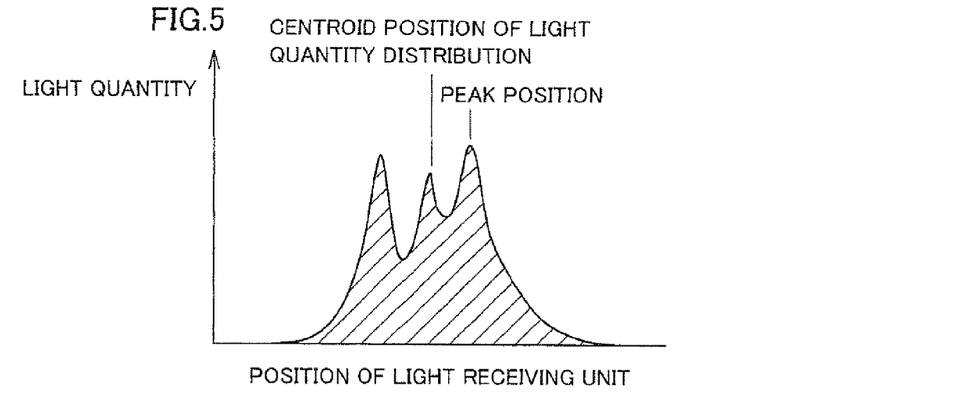
Figure 6:
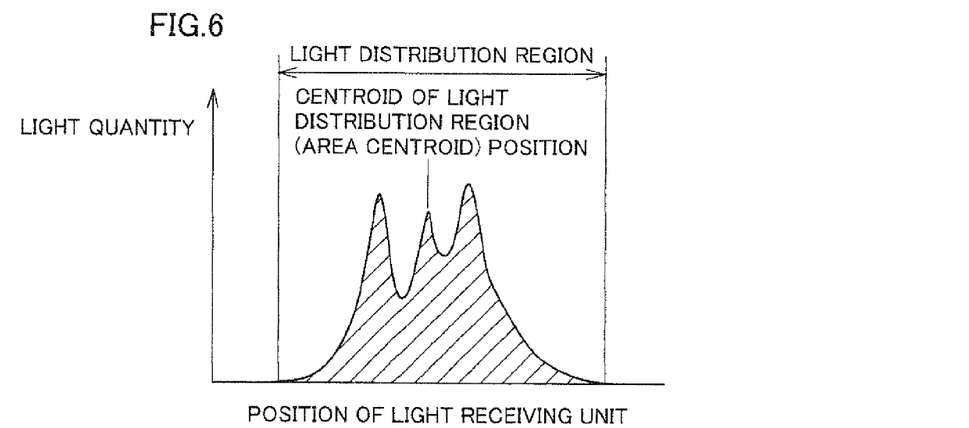

Referring to FIGS. 4 to 6, description will be given on a method of obtaining the light spot position. In a typical example, as shown in FIG. 4, a position corresponding to a peak value of the light quantity is sensed as a light spot position (light collection position) on the light receiving unit. As shown in FIG. 5, however, a position corresponding to a centroid (light quantity centroid) of the light quantity distribution obtained by weighting with the light quantity may be used as the spot position. Also, as shown in FIG. 6, a position corresponding to a geometrical centroid of the light distribution region may be used as the spot position.

The method that uses the position corresponding to the peak value of the light quantity as the spot position is effective for the distribution in which the distribution of the light quantity smoothly decreases with respect to a center defined by a peak. As shown in FIGS. 5 and 6, however, a plurality of portions of large light quantities may be distributed. In these cases, when the peak position is simply sensed as the spot position, a position of a portion of a value slightly smaller than the peak position is ignored, and the spot position cannot be obtained accurately. In this case, it is preferable to employ the method of obtaining the position defining the centroid of the light quantity distribution, and the method of obtaining the position (area centroid) defining the centroid of the distribution region.

The spot position may be obtained by recalculation based on the processing results of at least two methods selected from among the above three methods, and thereby the light spot position can be obtained more accurately with high reproducibility.

Figure 7A:
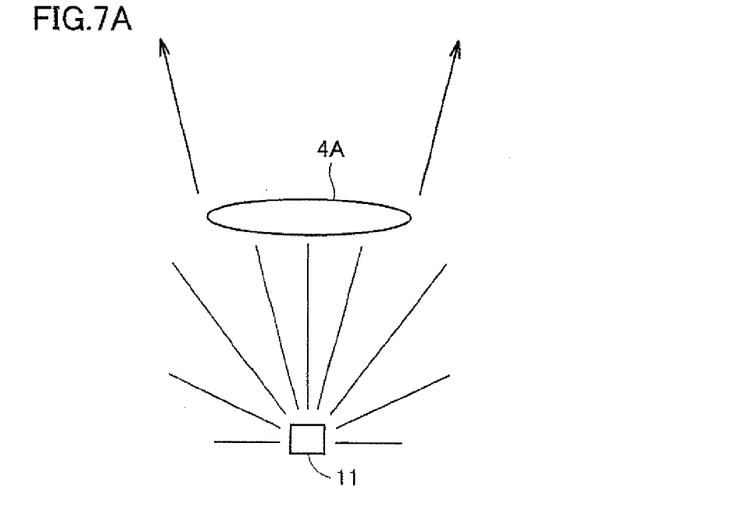
FIGS. 7A-7C illustrate variations of the structure of the light receiving element.
Figure 7B:
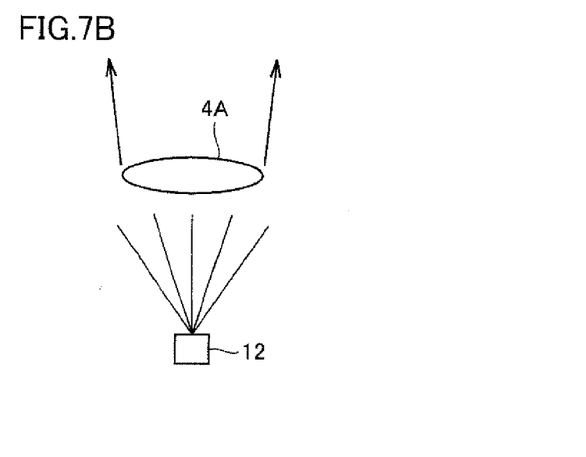
Figure 7C:
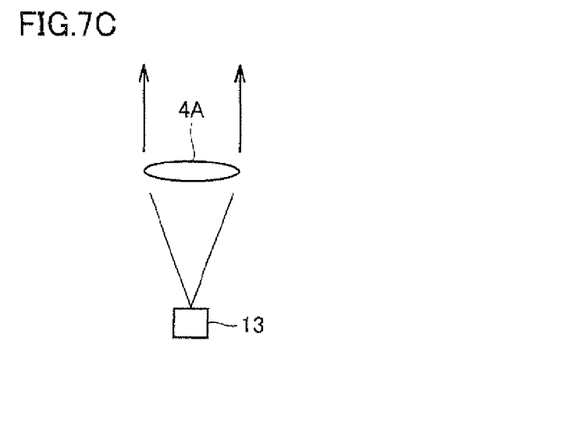

Referring to FIGS. 7A-7C, variations of the structure of light emitting element 1 will be described below. As shown in FIG. 7A, a light-emitting diode 11 is used as light emitting element 1. In this case, the light is emitted in all directions so that the size of lens 4A must be increased to a certain extent for using this light as effectively as possible. Conversely, as shown in FIGS. 7B and 7C, when an RCLED (Resonant Cavity LED) 12 or a VCSEL (Vertical Cavity Surface Emitting Laser) 13 is employed, a light radiation angle can be small and a light emission direction can be limited so that the diameter and the focal distance of lens 4A can be reduced. This is effective in reducing the sizes of the distance measuring sensor.

From a comparison between RCLED 12 and VCSEL 13, it is noted that VCSEL 13 has a smaller light radiation angle, and thus has the larger effect in size reduction, and RCLED 12 has a cost advantage. Further, VCSEL 13 emits the light from the chip top surface, and therefore offers a better mounting property in the structure that has light emitting element 1 mounted on lead frame 6 (because an ordinary semiconductor laser emits the light from a chip side surface and therefore cannot be mounted on a lead frame). Further, each of RCLED 12 and VCSEL 13 can offer an advantage that it emits the effectively available light that is much larger than that emitted by light-emitting diode 11, requires a smaller amount of current for the light emission and can reduce current consumption (this effect is achieved more remarkably by VCSEL 13 than RCLED 12). Each of RCLED 12 and VCSEL 13 forms the light emission point that is smaller in size than that of light-emitting diode 11, and therefore allows formation of parallel rays by lens 4A on the light emitting side without difficulty (light-emitting diode 11 cannot provide parallel rays, and beams thereof diverge to a certain extent). Therefore, RCLED 12 and VCSEL 13 can improve the accuracy of the distance measurement (this effect is likewise achieved more remarkably by VCSEL 13 than RCLED 12).

Figure 8:
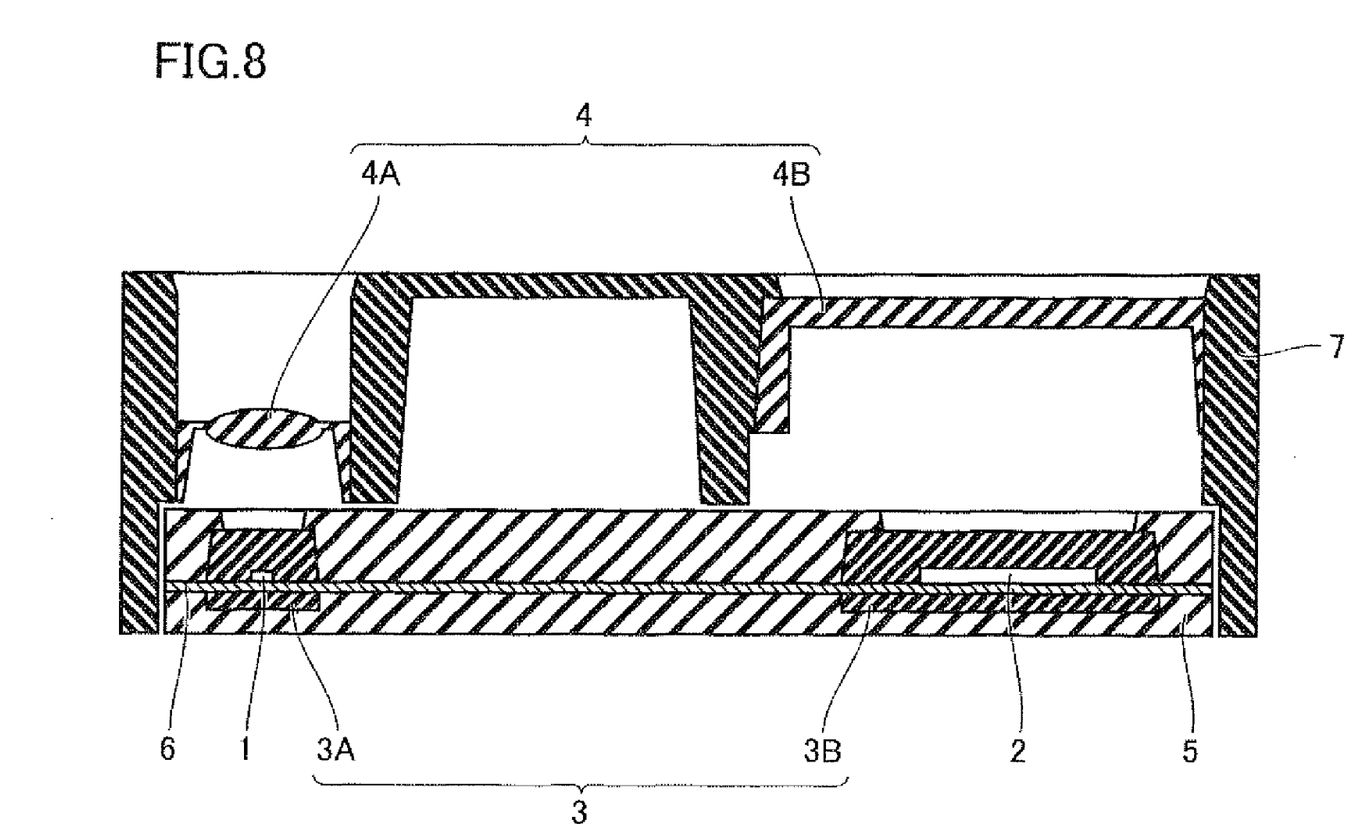
FIG. 8 is a cross section of a modification of the optical distance measuring sensor according to the first embodiment.

FIG. 8 is a cross section of a modification of the optical distance measuring sensor according to the embodiment. In this modification, as shown in FIG. 8, a Fresnel lens is used as lens 4B on the light receiving side.

Figure 9A:
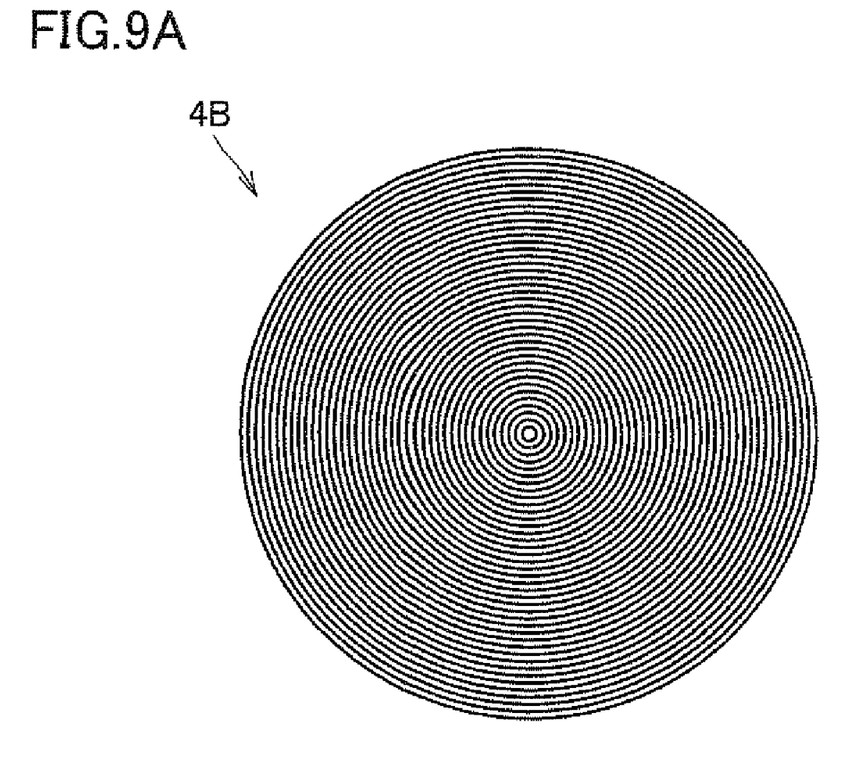
FIGS. 9A and 9B are a plan and a side view showing Fresnel lens, respectively.
Figure 9B:
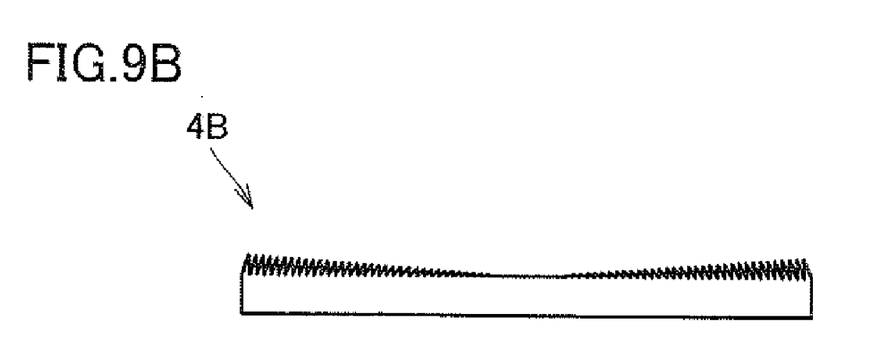

Lens 4B on the light receiving side is required to take the light reflected by the target object into light receiving unit 21 as much as possible, and therefore it is demanded to increase its lens diameter. However, when the lens diameter of the ordinary lens increases, the lens focal distance increases and the sizes of the distance measuring sensor tend to increase. Conversely, when the Fresnel lens is used, the lens focal distance can be reduced while keeping a large lens diameter. Further, as shown in FIGS. 9A and 9B, the thickness of lens 4B can be reduced. Consequently, the sizes of the distance measuring sensor can be reduced. Particularly, the height of the distance measuring sensor can be reduced.

Figure 10:
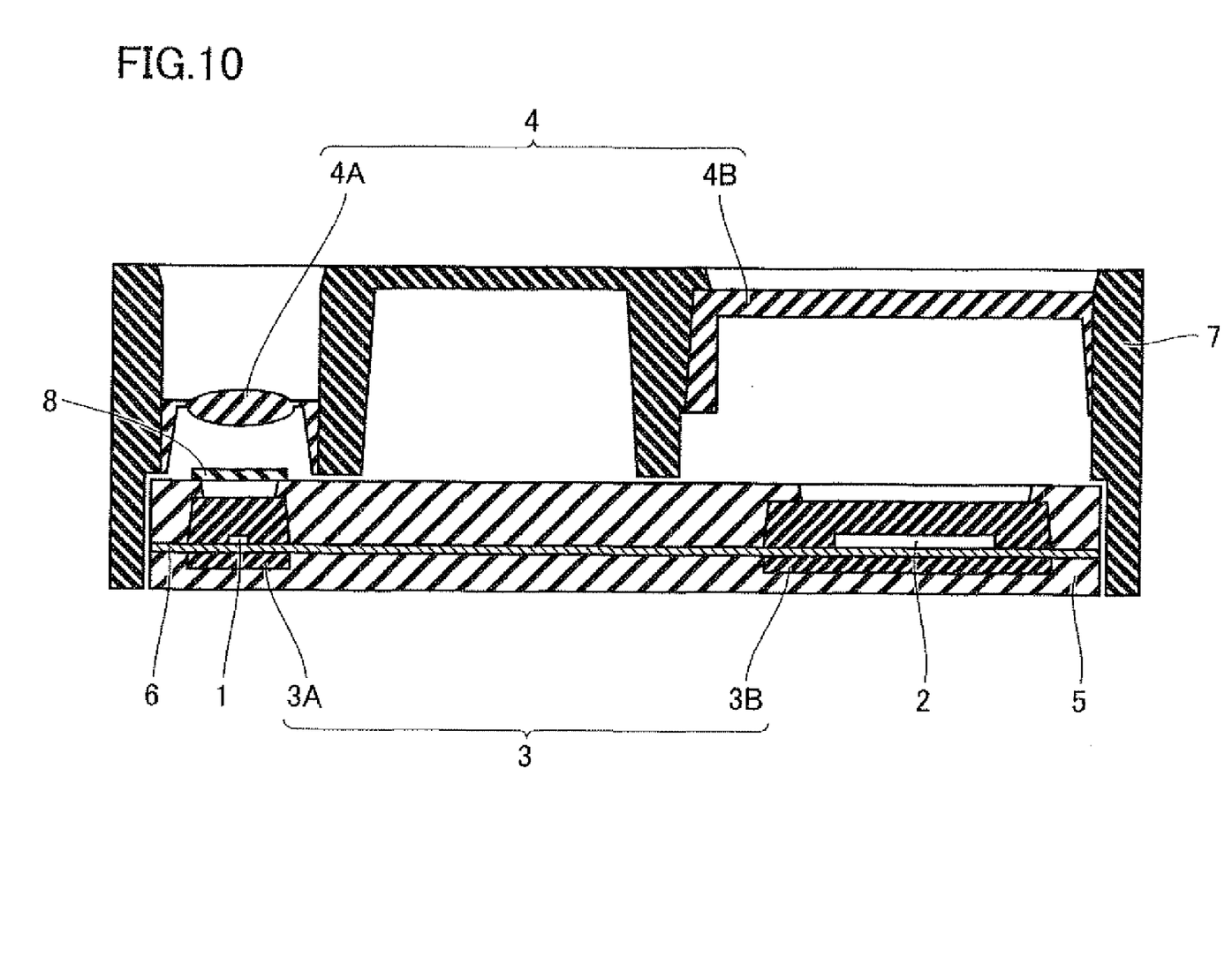
FIG. 10 is a cross section of another modification of the optical distance measuring sensor.
Figure 11:
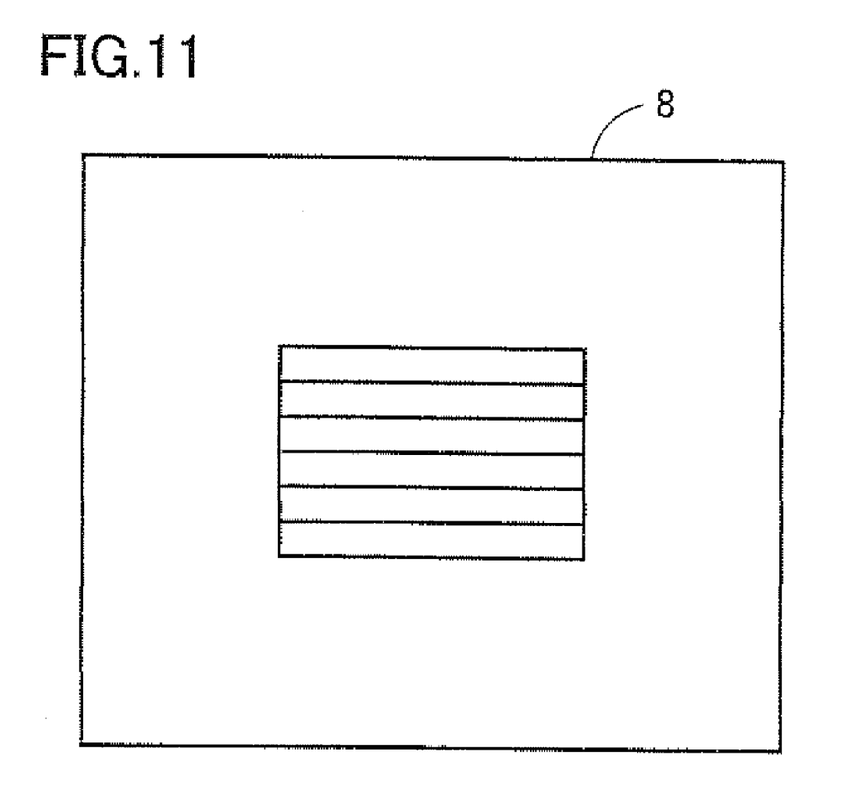
FIG. 11 is a top view of a diffraction grating included in the optical distance measuring sensor shown in FIG. 10.

FIG. 10 is a cross section of another modification of the optical distance measuring sensor according to the embodiment. Referring to FIG. 10, the distance measuring sensor according to this modification has a distinctive feature that a diffraction grating 8 (see FIG. 11) is arranged on an optical path extending from light emitting element 1 to the target object. Diffraction grating 8 splits the light emitted from light emitting element 1 in the direction perpendicular to the alignment direction light emitting element 1 and light receiving element 2 (i.e., in the direction perpendicular to the sheet of FIG. 10). Thus, the distance measuring sensor according to this modification is an optical distance measuring sensor for multi-beams produced by dividing the emitted beams. Each of the divided beams has the same light intensity as the others.

Figure 12:
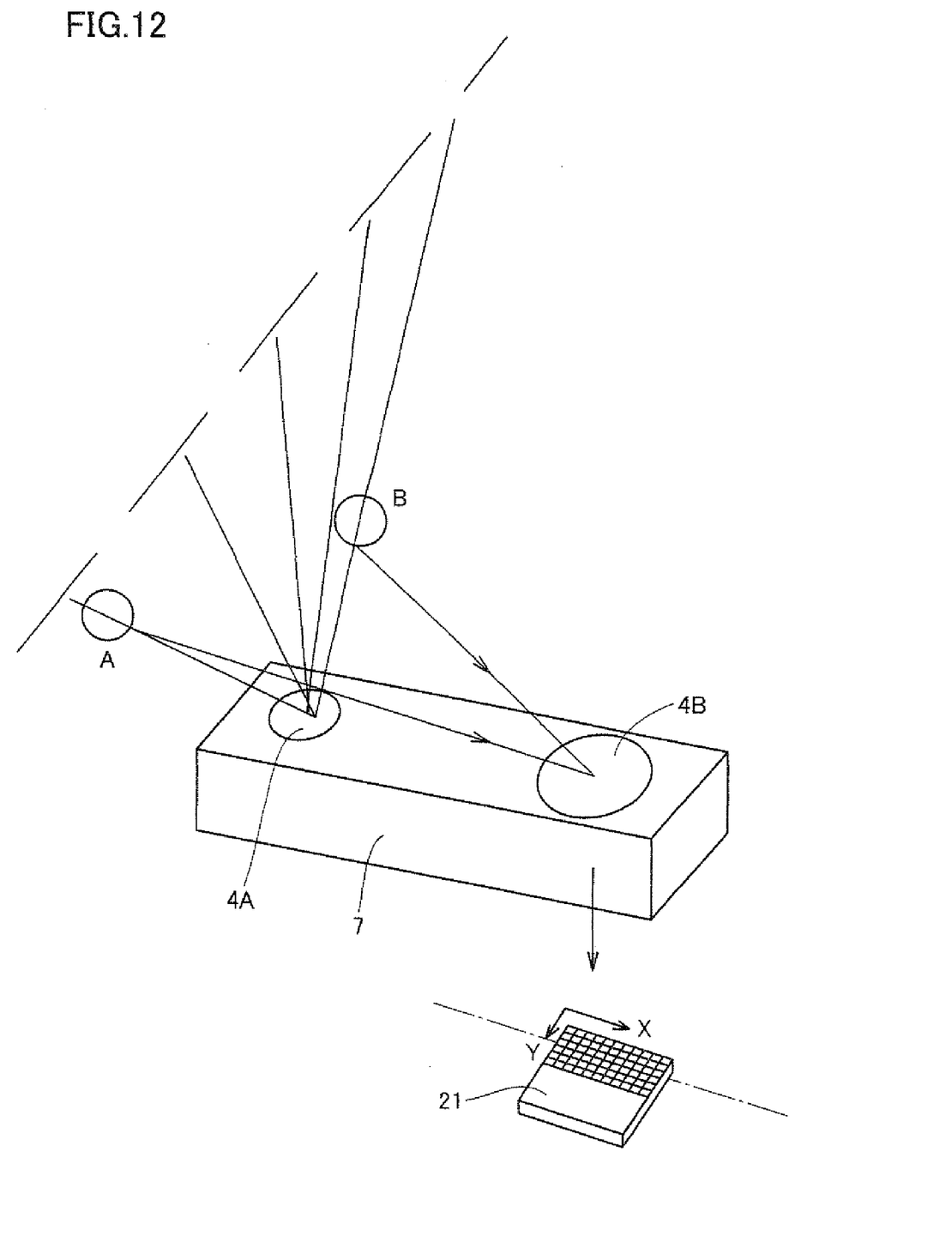
FIG. 12 is a perspective view illustrating a state of use of the optical distance measuring sensor shown in FIG. 10.

FIG. 12 is a perspective view illustrating a state of use of the optical distance measuring sensor shown in FIG. 10. Referring to FIG. 12, when target objects A and B are present within the sensing range, a part of the light reflected by each of target objects A and B is collected on light receiving unit 21 in the CMOS area sensor through lens 4B on the light receiving side. This light collected position (spot position) varies in an X-axis direction in FIG. 12 depending on the distance from the sensor to the target object (and moves in the negative direction of the X-axis as the distance increases). Also, it varies in the direction of a Y-axis in FIG. 12 depending on the direction from the sensor toward the target object. Therefore, the position of the target object can be sensed according to the position of the spot position on light receiving unit 21. As shown in FIG. 12, when a plurality of target objects are present, the position of each target object can be sensed.

The light used in this optical distance measuring sensor may be infrared rays, which can reduce the influence by ambient light. The light emission wavelength of light emitting element 1 may be in an infrared range, the light receiving wavelength of the CMOS area sensor may have a peak sensitivity in the infrared range, and lenses 4A and 4B on the receiving and emitting side may have the optical characteristics that cut off the visible light. Thereby, the measurement can be performed without an influence when indoor light of a fluorescent lamp or the like is used. However, when the sensor is used in an environment of the light such as incandescent light or sunlight containing the infrared rays, further devising is required. For example, the sensor may be devised to have the following function. Drive circuit unit 26 that drives light emitting element 1 according to predetermined timing causes light emitting element 1 to perform pulse emission a predetermined number of times for a predetermined period, and signals on light receiving element 2 side are extracted as valid signals in synchronization with the above pulse emission, and are output as an average corresponding to the number of times of the pulse emission.

According to the optical distance measuring sensor of the embodiment, since light receiving unit 21 that collects the light reflected by the target object has the plurality of cells, the accurate measurement can be performed without excessively increasing the distance (A) between the lenses as well as the focal distance (f) between light receiving unit 21 and lens 4B on the light receiving side. Therefore, the optical distance measuring sensor can have the reduced sizes and the high measurement accuracy.

The contents described above can be summarized as follows. The optical distance measuring sensor according to the embodiment is the optical distance measuring sensor for sensing the distance to the target object by the triangulation method, and includes light emitting element 1, light receiving element 2 arranged on the same plane as light emitting element 1, transparent resin units 3 (3A and 3B) serving as the "first and second transparent resin units" sealing light emitting element 1 and light receiving element 2, respectively, lenses 4 (4A and 4B) serving as the "first and second lenses" arranged forward of light emitting element 1 and light receiving element 2, respectively, and light-blocking resin unit 5 holding light emitting element 1 and light receiving element 2 to form the predetermined distance (A) between light emitting element 1 and light receiving element 2. Light receiving element 2 includes light receiving unit 21 having the plurality of cells 21A and collecting the light emitted from light emitting element 1 and reflected by the target object, flash memory unit 25 serving as a "memory unit" storing a predetermined position on light receiving unit 21, and a signal processing circuit unit 22 serving as an "arithmetic operation unit" that senses the collection position of the light on light receiving unit 21, and measures the distance to the target object based on the relative positional relationship between the predetermined position stored in flash memory unit 25 and the collection position of the light on light receiving unit 21.

Although the present example embodiment has been described and illustrated in detail, it is clearly understood that the same is by way of illustration and example only and is not to be taken by way of limitation, the scope of the present example embodiment being interpreted by the terms of the appended claims.

What is claimed is:

1. An optical distance measuring sensor for sensing a distance to a target object by a triangulation method, comprising:
   a light emitting element;
   a light receiving element arranged on the same plane as said light emitting element;
   first and second transparent resin units sealing said light emitting element and said light receiving element, respectively;
   first and second lenses arranged forward of said light emitting element and said light receiving element, respectively; and
   a light-blocking resin unit holding said light emitting element and said light receiving element to form a predetermined distance between said light emitting element and said light receiving element,
   said light receiving element including:
   a light receiving unit having a plurality of cells and collecting light emitted from said light emitting element and reflected by said target object,
   a memory unit storing a predetermined position on said light receiving unit corresponding to a predetermined distance of the sensor to the target object, and
   an arithmetic operation unit sensing a collection position of said light on said light receiving unit based on a result of the sensing of said light by the plurality of cells, and measuring a distance to said target object based on a relative positional relationship between said predetermined position stored in said memory unit and said collection position of the light on light receiving unit.

2. The optical distance measuring sensor according to claim 1, wherein
   said plurality of cells are arranged in one row in a direction of alignment of said light emitting element and said light receiving element.

3. The optical distance measuring sensor according to claim 1, wherein
   a width of each of said plurality of cells in a direction of alignment of said light emitting element and said light receiving element is 5 µm or less.

4. The optical distance measuring sensor according to claim 1, wherein
   a distance between centers of said first and second lenses is 10 mm or less, and
   a width of said light receiving unit in a direction of alignment of said light emitting element and said light receiving element is 5 mm or less.

5. The optical distance measuring sensor according to claim 1, wherein
   a distance between centers of said first and second lenses is 2 mm or less, and
   a width of said light receiving unit in a direction of alignment of said light emitting element and said light receiving element is 1.5 mm or less.

6. The optical distance measuring sensor according to claim 1, wherein
   said arithmetic operation unit senses a position corresponding to a peak value of a light quantity as said collection position of the light on said light receiving unit based on a light quantity distribution on said light receiving unit.

7. The optical distance measuring sensor according to claim 6, wherein
   the predetermined position on said light receiving unit stored in said memory unit is calculated based on the positions corresponding to the peak value of the light quantity, a centroid of the light quantity and a geometrical centroid of a distribution region, respectively, each obtained based on the light quantity distribution of the light emitted by said light emitting element, reflected by an object spaced from said optical distance measuring sensor by a predetermined distance and collected on said light receiving unit, or is calculated based on a combination of said positions.

8. The optical distance measuring sensor according to claim 1, wherein
   said arithmetic operation unit senses a position corresponding to a centroid of a light quantity as said collection position of the light on said light receiving unit based on a light quantity distribution on said light receiving unit.

9. The optical distance measuring sensor according to claim 8, wherein
   the predetermined position on said light receiving unit stored in said memory unit is calculated based on the positions corresponding to a peak value of a light quantity, the centroid of the light quantity and a geometrical centroid of a distribution region, respectively, each obtained based on the light quantity distribution of the light emitted by said light emitting element, reflected by an object spaced from said optical distance measuring sensor by a predetermined distance and collected on said light receiving unit, or is calculated based on a combination of said positions.

10. The optical distance measuring sensor according to claim 1, wherein
    said arithmetic operation unit senses, based on a distribution of light quantity on said light receiving unit, a position corresponding to a geometrical centroid of a region of the distribution as said collection position of the light on said light receiving unit.

11. The optical distance measuring sensor according to claim 10, wherein
    the predetermined position on said light receiving unit stored in said memory unit is calculated based on the positions corresponding to a peak value of a light quantity, a centroid of the light quantity and the geometrical centroid of the distribution region, respectively, each obtained based on the light quantity distribution of the light emitted by said light emitting element, reflected by an object spaced from said optical distance measuring sensor by a predetermined distance and collected on said light receiving unit, or is calculated based on a combination of said positions.

12. The optical distance measuring sensor according to claim 1, wherein
    said arithmetic operation unit senses, based on a distribution of light quantity on said light receiving unit, at least two positions selected among a position corresponding to a peak value of a light quantity, a position corresponding to a centroid of a light quantity and a position corresponding to a geometrical centroid of a region of the distribution, and calculates said collection position of the light on said light receiving unit based on a combination of results of the sensing.

13. The optical distance measuring sensor according to claim 12, wherein
    the predetermined position on said light receiving unit stored in said memory unit is calculated based on the positions corresponding to the peak value of the light quantity, the centroid of the light quantity and the geometrical centroid of the distribution region, respectively, each obtained based on the light quantity distribution of the light emitted by said light emitting element, reflected by an object spaced from said optical distance measuring sensor by a predetermined distance and collected on said light receiving unit, or is calculated based on a combination of said positions.

14. The optical distance measuring sensor according to claim 1, wherein
the second lens arranged forward of said light receiving element is a Fresnel lens.

15. The optical distance measuring sensor according to claim 1, wherein
said light emitting element is a resonant cavity light-emitting diode.

16. The optical distance measuring sensor according to claim 1, wherein
said light emitting element is a vertical cavity surface emitting laser.

17. The optical distance measuring sensor according to claim 16, further comprising:
a diffraction grating arranged on an optical path extending from said light emitting element to said target object, and splitting the light emitted from said light emitting element in a direction perpendicular to the alignment direction said light emitting element and said light receiving element.

18. The optical distance measuring sensor according to claim 1, wherein
said light emitting element and said light receiving element are mounted on a common lead frame.

19. An electronic device comprising the optical distance measuring sensor according to claim 1.

20. The optical distance measuring sensor according to claim 1, wherein
the arithmetic operation unit measures a distance to said target object based only on a relative positional relationship between said predetermined position stored in said memory unit and said collection position of the light on said light receiving unit;
a width of each of said plurality of cells in a direction of alignment of said light emitting element and said light receiving element is 5 μm or less; and
a width of said light receiving unit in a direction of alignment of said light emitting element and said light receiving element is 5 mm or less.

* * * * *